(12) United States Patent
Engel

(10) Patent No.: US 11,590,797 B2
(45) Date of Patent: Feb. 28, 2023

(54) FREEWHEEL ASSEMBLY SWITCHABLE BETWEEN FIXED-GEAR AND FREEWHEEL MODES

(71) Applicant: Nicholas Redmond Engel, San Frandcisco, CA (US)

(72) Inventor: Nicholas Redmond Engel, San Frandcisco, CA (US)

(*) Notice: Subject to any disclaimer, the term of this patent is extended or adjusted under 35 U.S.C. 154(b) by 1236 days.

(21) Appl. No.: 15/287,643

(22) Filed: Oct. 6, 2016

(65) Prior Publication Data

US 2017/0096030 A1 Apr. 6, 2017

Related U.S. Application Data

(60) Provisional application No. 62/237,642, filed on Oct. 6, 2015.

(51) Int. Cl.
| | | |
|---|---|---|
| B60B 27/04 | (2006.01) |
| B60B 27/02 | (2006.01) |
| F16D 41/30 | (2006.01) |
| B60B 27/00 | (2006.01) |

(52) U.S. Cl.
CPC ........ B60B 27/047 (2013.01); B60B 27/0015 (2013.01); B60B 27/0026 (2013.01); B60B 27/023 (2013.01); F16D 41/30 (2013.01); B60B 2900/351 (2013.01)

(58) Field of Classification Search
CPC . B60B 27/04; B60B 27/0015; B60B 27/0026; B60B 27/023; F16D 41/30
See application file for complete search history.

(56) References Cited

U.S. PATENT DOCUMENTS

| | | | | |
|---|---|---|---|---|
| 1,278,648 | A * | 9/1918 | Henry | F16D 41/30 192/64 |
| 5,332,294 | A * | 7/1994 | Haeussinger | B60B 27/023 192/64 |
| 5,718,315 | A * | 2/1998 | Chen | B60B 27/023 192/45.1 |
| 6,588,564 | B1* | 7/2003 | Jager | B60B 27/0073 192/64 |
| 8,757,341 | B2* | 6/2014 | Klieber | F16D 41/36 192/64 |
| 2002/0014384 | A1* | 2/2002 | Kroger | F16D 41/30 192/46 |
| 2006/0040776 | A1* | 2/2006 | Hansen | B60B 27/04 474/160 |
| 2013/0299293 | A1* | 11/2013 | Corley | F16D 41/30 192/32 |

* cited by examiner

*Primary Examiner* — Colby M Hansen
(74) *Attorney, Agent, or Firm* — Cittone Demers & Arneri LLP; James P. Demers

(57) ABSTRACT

A bicycle freewheel assembly is provided which is capable of being readily and reversibly switched from fixed-gear to freewheel operation, without the necessity of removing the wheel from the bicycle. The freewheel assembly is mountable on pre-existing freewheel hubs.

9 Claims, 12 Drawing Sheets

FREEWHEEL ASSEMBLY SWITCHABLE BETWEEN FIXED-GEAR AND FREEWHEEL MODES

RELATED APPLICATIONS

This application claims priority to U.S. provisional patent application No. 62/237,642 filed on Oct. 6, 2015, the entire contents of which are incorporated herein by reference.

FIELD OF THE INVENTION

This invention relates to rear-wheel hubs for bicycles, and in particular to hubs that are convertible between freewheel and fixed-gear modes of operation.

BACKGROUND

Almost all consumer-grade bicycles sold today are multi-speed bikes, in which a sprocket package, also referred to as a cogset, is connected via a freewheel mechanism to the rear wheel hub. A derailleur is used to move the drive chain from one sprocket to another, enabling the rider to select the gearing. Some bicycles employ gear hubs, wherein a planetary epicyclic gearset is contained within the hub. These usually feature a single sprocket, but a freewheel mechanism is still needed.

One design employs an assembly of a cogset and a drive ring, the assembly having built within it a ratchet mechanism. The cogset, drive ring, and internal ratchet are collectively referred to as a freewheel assembly, which in older designs is threaded onto a freewheel hub. More modern designs employ splines to couple the freewheel hub to the drive ring.

An alternative design employ a cassette, which is a bolted-together cluster of sprockets having no internal ratchet, and a "freehub" which contains the ratchet mechanism. A set of interior straight splines around the open axis of the cassette align with matching splines on the freehub axle, enabling the cassete to be rotationally locked to the freehub axle when mounted thereon. The freehub body and axle are in a freewheeling relationship.

There are two common ratchet mechanisms in use today. One design employs movable pawls distributed around (or within) the circumference of an internal ratchet. The pawls ride on the ratchet, sliding up the gently sloped side of each tooth when the ratchet and pawls are rotated in one relative direction, but rigidly engaging the other, steeply-sloped side of the ratchet teeth when the ratchet and pawls rotate in the opposite relative direction. The other design is the "star ratchet", in which two disks with spur or face gearing face each other and are biased against each other. The biasing force is provided by a spring, or in some cases by magnets. Relative rotation in one direction engages opposing, steeply-faced ratchet teeth, rotationally locking the disks together and enabling pedaling force to be transmitted from one disk (coupled to the sprocket or cogset) to the other (coupled to a drive ring or to the hub). Relative rotation in the opposite direction, as when the rider stops pedaling, results in opposed, sloped surfaces of the ratchet teeth sliding past one another. The resulting axial displacement of the disks against the biasing force results in decoupling and free relative rotation of the disks. Representative examples of the star ratchet may be found in U.S. Pat. Nos. 6,588,564, 7,562,755 and 8,757,341, the disclosures of which are incorporated herein by reference in their entireties.

Whether it is of the pawl-and-ratchet or star-ratchet design, the freewheel mechanism ensures that during a forward motion of the pedals the drive force, transmitted via the chain, is transmitted to the rear wheel, and that during a motion in the opposite direction, i.e., when the crank is moving backwards or is at a standstill, the sprocket or cogset is decoupled from the wheel, which therefore rotates freely.

In contrast to the above-described multi-speed bicycles with freewheel mechanisms, there is the simple fixed-gear bicycle, or "fixie", featuring a single sprocket rigidly attached to the wheel hub. The rider of a fixed-gear bicycle cannot stop pedaling while the bike is in motion, due to the absence of a freewheel mechanism between the pedal crank and the rear wheel, although some riders learn to brake by kicking back and locking the pedals and rear wheel, causing the bike to skid to a stop. The fixed-gear design, commonly found on track racing bicycles, has become popular with urban riders, particularly bicycle messengers, and a fixie sub-culture has emerged among riders in many U.S. and European cities. The fixed-gear bicycle has certain advantages, chiefly light weight, simplicity, and reliability, and the fixed connection between rider and wheel enables stunts that are difficult or impossible with a freewheel. A fixed-gear bicycle generally offers a low gearing ratio, which is well-suited to stop-and-go urban riding, although some riders prefer the high ratio of a track bicycle, which affords greater speed.

Riders of fixed-gear bicycles find that the design, while suited for short trips in a city, is not convenient for long rides or touring, where high gearing ratios are desirable for high speeds, and where the ability to coast on downhill runs conserves a rider's energy. High speed downhill runs are particularly problematic for the rider of a fixed-gear bike, because there is a limit to how fast the legs can be moved. Riders of freewheel, multispeed bicycles find that their machines are not suited for stunt riding, and that—because a derailleur cannot function when the bike is stopped—shifting gears in stop-and-go city riding can become a chore. In both cases, an expensive solution is to own two bicycles, one of each design, but this still requires that the rider select one bicycle or the other prior to setting out for the day.

A common solution to this problem is the "flip-flop hub", a rear bicycle hub that features a fixed cog on one side and a freewheel on the other. The rider can switch between freewheel and fixie modes by removing and flipping the rear wheel. While this is, in principle, a simple solution, the flip-flop hub has some disadvantages. Although long dropouts permit some variation, the gearing on the freewheel side of a flip-flop hub cannot much differ from the gearing on the fixed side, unless one also alters the chain length. Given that higher gearing is one of the principal reasons one would want to switch out of the fixed-gear mode, this is a major shortcoming. The need to not only remove the rear wheel, but to add or remove links from the chain, or to substitute a chain of different length, makes the switch between modes an inconvenient, messy operation if altered gearing is desired. Also, given the different axial dimensions of fixed sprockets and freewheel assemblies, dishing of the rear wheel may not be symmetrical, and the brakes may require re-alignment when the wheel is flipped. Brakes may also need re-positioning if a long dropout is relied on to enable altered gearing.

A complicated friction clutch mechanism, that reversibly fixes a freewheel hub via the engagement and disengagement of male and female conical surfaces, is described in U.S. Pat. No. 1,278,648 (issued to G. Henry in 1918.) The design, intended for a stationary exercise bike, suffers from weak frictional coupling of the surfaces, which cannot hold against the forces applied by a rider engaged in braking or in performing stunts.

A design for a hub in which pawls are reversibly engaged or disengaged from a ratchet to effect a switch between fixed-gear and freewheel modes is disclosed in U.S. patent application publication No. 2013/0299293 (Nov. 14, 2013). In this design, in order to switch modes, it is necessary to disassemble the hub, remove and relocate springs that bias the pawls into or out of engagement with the ratchet, and then re-assemble the hub. This is an inconvenient process for the user, and is impractical for use when on the road.

Further designs are disclosed in GB Patent Nos. 446,136 (to J. MacKay et al., 1936) and 451,299 (to W. Woodcock, 1936). In these designs, pawls are mechanically displaced to disengage them from their ratchets. These designs are mechanically complex, and cannot be retroactively installed on an existing hub assembly.

A more recent design for a hub in which pawls are reversibly engaged or disengaged from a ratchet to effect a switch between fixed-gear and freewheel modes is disclosed in U.S. Pat. No. 8,100,242 (to M. Schneider and K.-J. Kiihne, Jan. 24, 2012). A commercial embodiment of this design is marketed by SRAM Deutschland GmbH of Schweinfurt, Germany under the trade name "Torpedo Singlespeed". This hub weighs 480 g, which would be considered heavy by riders of track and fixie bicycles. The hub is switched between fixed and freewheel modes by driving an axial screw inwards or outwards, thereby sliding a set of pawl-blocking blades into or out of place between the pawls and the ratchet. This requires components specifically manufactured with and installed within the hub, and thus the device cannot be installed on an existing bicycle hub. A would-be user must purchase the entire specialized hub, and then build (or have built) a wheel around it. Furthermore, the construction of this custom wheel is limited to the number of spokes supported by the hub.

There remains a need for a bicycle that can be quickly, conveniently, and easily switched between freewheel and fixed-gear modes. There is a need for a device which provides positive engagement between the hub and sprocket, and which can be installed by bike shops or consumers on their current wheels and hubs.

SUMMARY OF THE INVENTION

The invention provides a freewheel assembly which can be set into a locked mode, wherein the sprocket is positively engaged with a drive ring that is mountable on existing freewheel hubs. The locked mode is achieved by various positive locking mechanisms, as described more fully below.

DETAILED DESCRIPTION OF THE INVENTION

Figure 1:
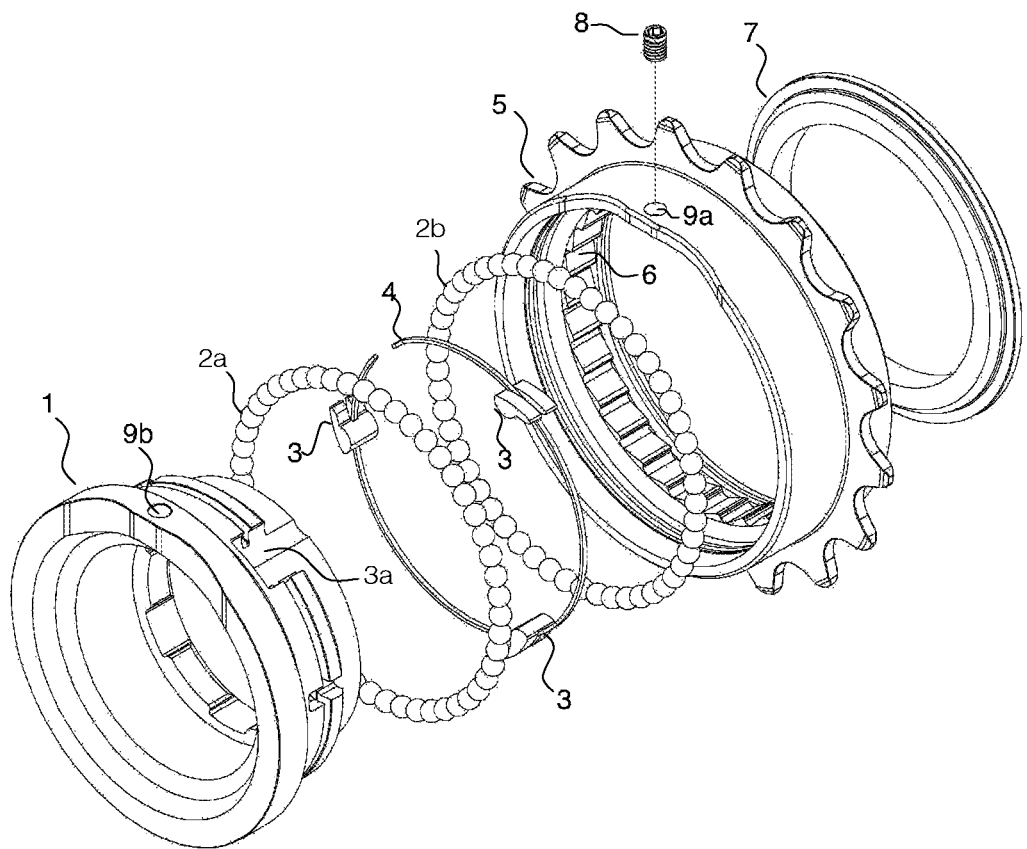
FIG. 1 is an exploded, perspective view of a first embodiment of the invention.

The present invention provides bicycle freewheel assemblies which are readily and reversibly converted from freewheel to fixed gear operation. In the various embodiments disclosed herein, a freewheeling sprocket is mechanically linked to a drive ring via a non-frictional positive locking mechanism. As used herein, a non-frictional positive locking mechanism is any mechanism that mechanically locks the freewheeling sprocket to the drive ring, without any possibility of slippage. Such locking is referred to as "positive engagement." The physical strength of the resulting positively locked linkage is limited only by the mechanical strength of the components. By employing a non-frictional positive locking mechanism, the invention avoids the use of a friction clutch, and thereby provides a rigid, reliable non-slipping linkage when the user selects the fixed-gear mode.

Suitable non-frictional positive locking mechanisms include, but are not limited to, set screws and pins that physically interfere with the rotation of a freewheeling sprocket relative the drive ring to which it is mounted, and set screws or pins that physically interfere with the motion of pawls in a pawl-and-ratchet freewheel assembly. Pins may be moved into a physically interfering position by hand, by a mechanical linkage such as a cable, by activation of a solenoid, or by any other convenient method of mechanical displacement known in the art. Another suitable non-frictional positive locking mechanism is a circumferential band or spring wrapped around the pawls. The band or spring defines a notched circle, which varies in diameter as the distance between the spring ends is varied. The band or spring is configured to physically interfere with the motion of the pawls in a pawl-and-ratchet freewheel assembly when the diameter is adjusted into the locking configuration, and to permit motion of the pawls when the diameter is adjusted into the freewheeling configuration. The spring may be a pawl spring, as described in greater detail below.

In one embodiment, one or more pins or set screws are set into the sprocket (or the drive ring), and the user moves these pins or set screws into holes or slots in the drive ring (or the sprocket) so as to prevent relative rotation of the sprocket and drive ring. The pin(s) or set screw(s) mechanically lock the drive ring and sprocket, preventing relative rotation and creating a rigid, non-slipping mechanical linkage. The drive ring, when mounted on a freewheel hub, thus locks the sprocket to the hub and wheel, which enables performance as a fixed-gear bicycle.

In another embodiment, the pawls of a conventional pawl-and-ratchet freewheel assembly are locked into place, preventing them from sliding up and over the teeth of the ratchet. The pawls may be locked by the motion of pins into a position that impedes their normal motion, or by a pawl spring that locks the pawls in an extended configuration, holding them firmly against the ratchet teeth and thereby preventing displacement of the pawls by the ratchet.

In yet another embodiment, a pair of star ratchets are rotationally fixed to the sprocket and to the drive ring, in a mutually facing co-axial arrangement. At least one of the ratchets is movable along the axis of the device. When the star ratchets are moved into engagement, the sprocket and the drive ring are locked against relative rotation in the freewheeling direction.

In certain embodiments, the motions of pins or ratchets are effected by one or more solenoids. The solenoids may be activated by a manual switch, or alternatively by an electrical circuit that is in turn activated via a short-range radio signal, preferably employing a digital wireless standard such as Bluetooth. The controller in these embodiments can be a dedicated Bluetooth transmitter, or it can be the user's portable wireless device, such as a smart phone, running an application designed to control the solenoids via the smart phone's Bluetooth transmitter.

Solenoids can be powered by batteries installed within the hub of the wheel, and/or by a dynamo or generator interior to the hub or attached to the bicycle frame and powered by the rotation of the wheels. In preferred embodiments the batteries are rechargeable cells and/or capacitors, which are maintained in a charged state by either a hub or "bottle" style magneto. In preferred embodiments, the mechanism is bi-stable, having stable locked and unlocked modes, and the solenoid is energized only when needed to transition between the two modes. The two states may be stabilized against undesired motion by mechanical detents, by biasing springs, or by magnets holding the movable parts in each of the two modes.

In other embodiments, the movement of pins or star ratchets are effected by electromechanical means, as is known in the art. Such means are typically DC motors drawing power from batteries, as used for electrical gear shifting systems. See, for example, U.S. Pat. Nos. 8,886,417 and 8,909,424, the contents of both of which are incorporated herein by reference in their entirety. As with solenoids, operation of a motor may be activated by a manual switch, or alternatively by an electrical circuit that is in turn activated via a short-range radio signal, preferably using a digital transmission standard such as Bluetooth.

Figure 2:
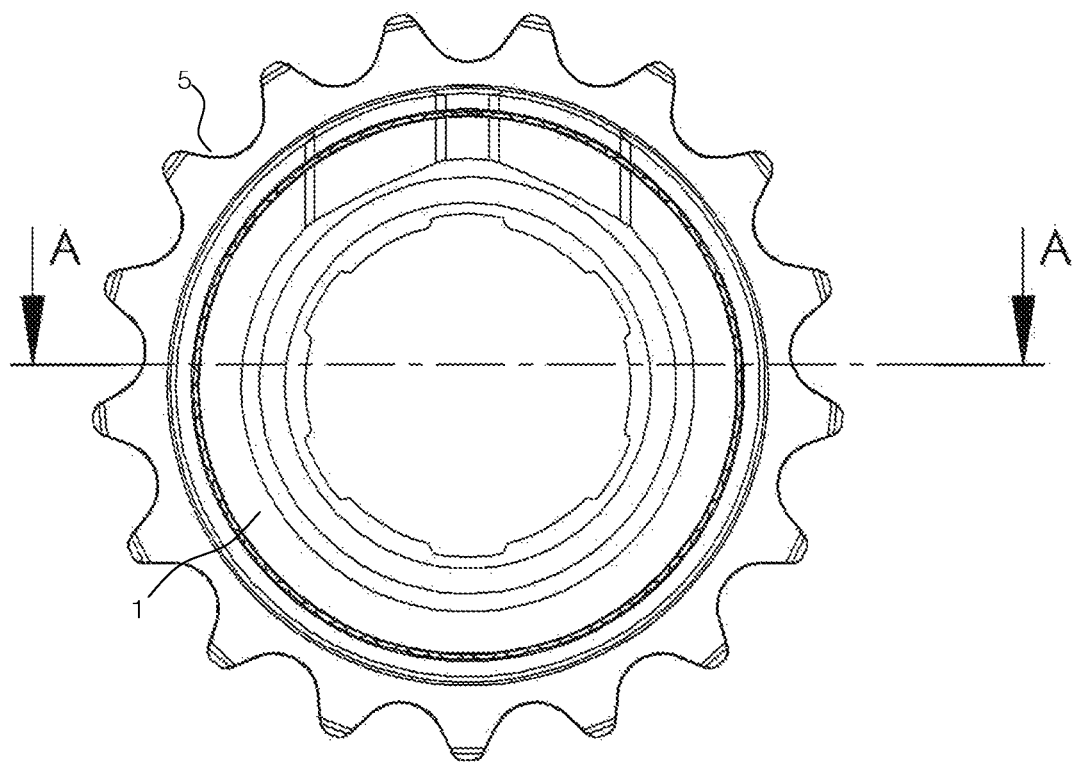
FIG. 2 is a side view of the fully-assembled embodiment of FIG. 1.
Figure 3:
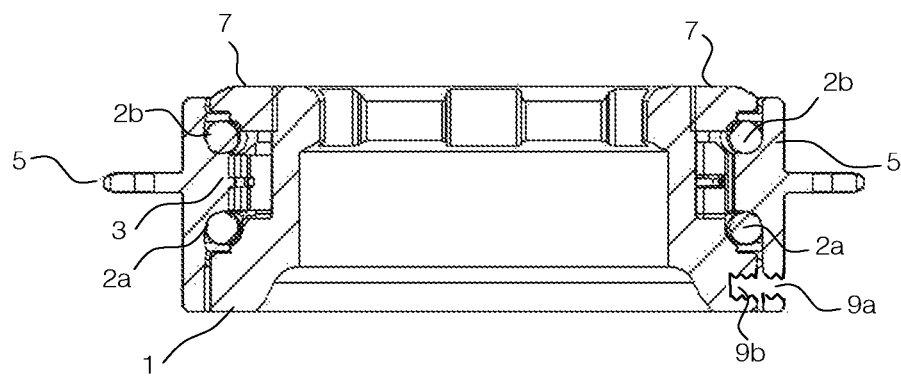
FIG. 3 is a sectional view taken along line A-A in FIG. 2.

Referring to FIGS. 1-3, a drive ring 1 rotates within ball bearing sets 2a and 2b, and is provided with recesses 3a which accommodate pawls 3. Pawls 3 are retained in the recesses 3a by pawl spring 4. Pawls 3 are also biased by pawl spring 4 against ratchet 6, which is formed on the inner surface of freewheel sprocket 5. Pawls 3 engage the steep faces of ratchet surface 6, and provide positive engagement between freewheel 5 and the drive ring 1, when the sprocket is driven the forward direction (FIG. 1 is a view from the wheel side of the sprocket, from which perspective "forward" is counter-clockwise.) When the sprocket is not being driven (when the rider stops pedaling), sprocket 5 stops rotating while the drive ring 1 continues to rotate counter-clockwise. In this mode, pawls 3 slide up and over the shallow sides of ratchet surface 6. Sealing ring 7 threads into freewheel 5 and retains the ball bearing set 2b. Set screw 8 is set within complimentarily-threaded hole 9a. Drive ring 1 is provided with hole 9b, which is located so that when the drive ring and freewheel are rotated to bring the holes 9a and 9b into register, the holes are coaxial. In the embodiment shown in FIG. 3, hole 9b is threaded with female threads complimentary to set screw 8. In alternative embodiments, hole 9b may be smoothly bored, and set screw 8 may optionally feature a complimentary unthreaded region. When the holes 9a and 9b are aligned in a coaxial relationship, set screw 8 can be spun down into hole 9b, thereby rotationally locking drive ring 1 to sprocket 5. In this locked mode, freewheeling is prevented, and the assembly, when mounted on a freehub, acts as a fixed-gear hub.

The holes 9a and 9b are preferably located so that they are coaxial when pawls 3 are in contact with the steep sides of ratchet 6, i.e., in position to transfer motive force from freewheel 5 to drive ring 1. This avoids the application of force from freewheel 5 to the set screw 8 which would occur if the pawls were not engaged. FIG. 3 is a cross section through the elevation shown in FIG. 2 along the plane A-A. In FIGS. 1 and 3, like elements are given like numbers.

In all embodiments shown in the drawings, the drive ring as shown is adaptated for mounting on a splined hub. The invention is not limited to this mounting structure, and the drive ring may be outfitted with any hub mounting structure known in the art.

Figure 4:
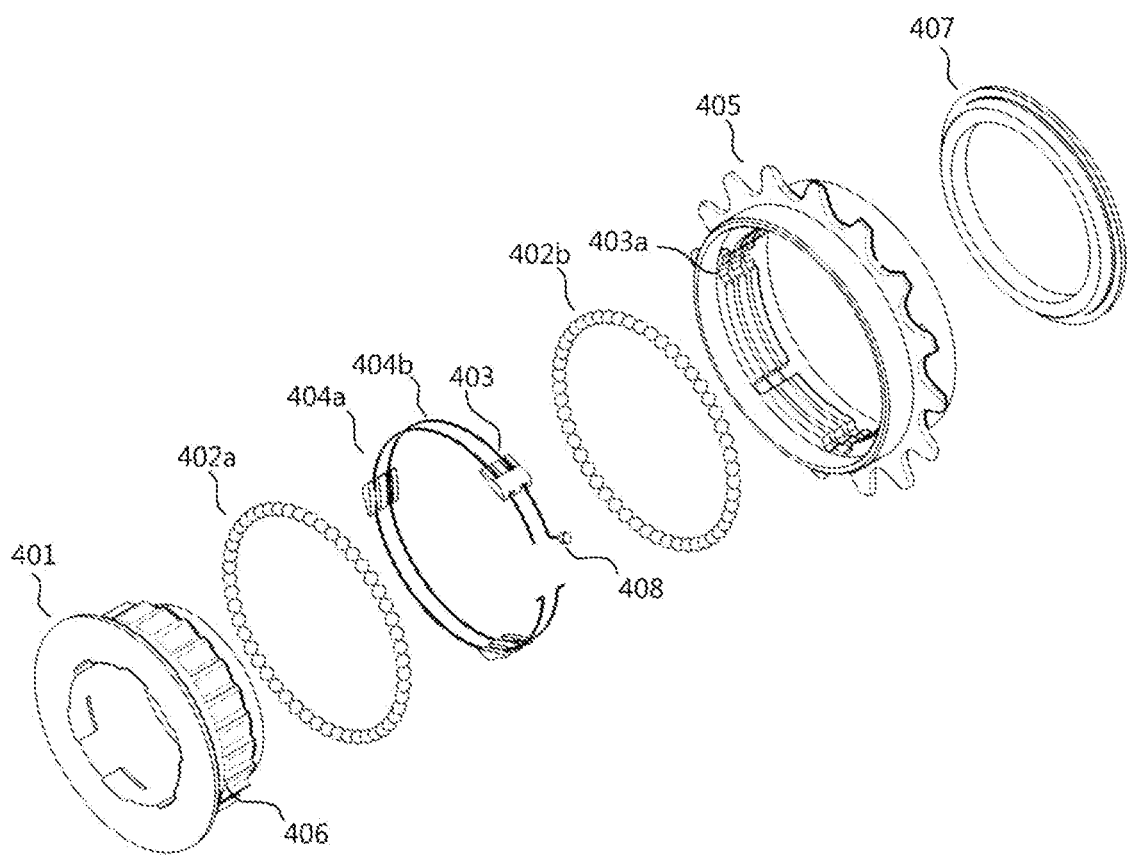
FIG. 4 is an exploded, perspective view of a second embodiment of the invention.
Figure 5:
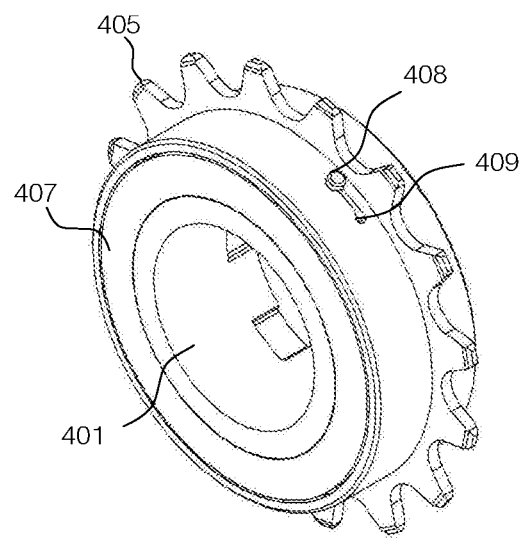
FIG. 5 is a perspective view of the assembled device of FIG. 4.
Figure 6:
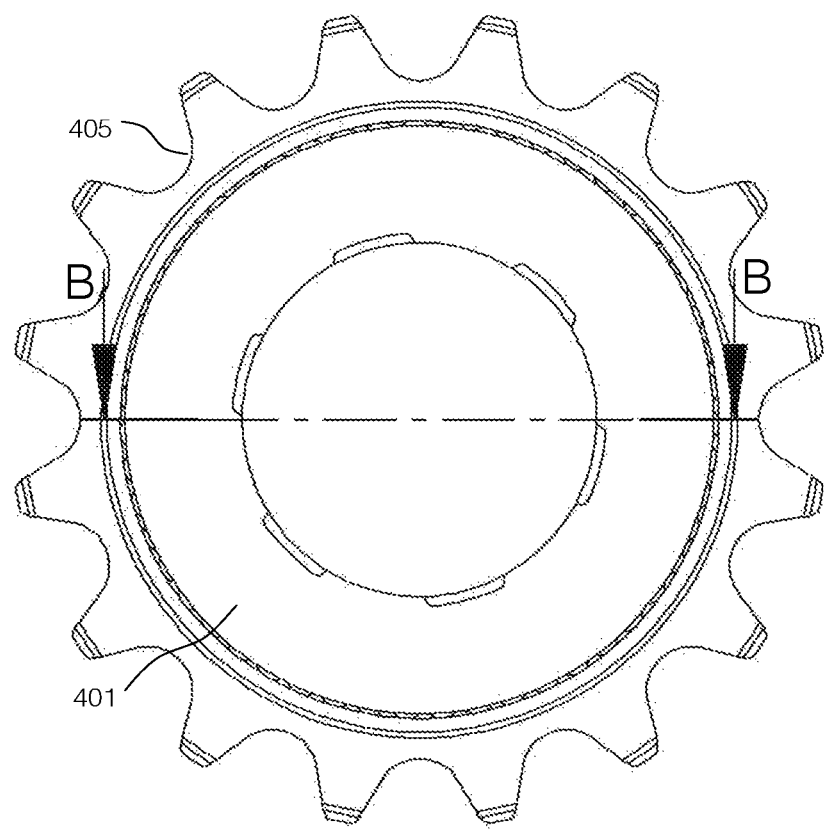
FIG. 6 is a side view of assembled device of FIG. 4

Referring to FIGS. 4-6, an alternative embodiment of the invention is shown, wherein drive ring 401 rotates within ball bearing sets 402a and 402b. Ratchet surface 406 is formed on the outer circumference of drive ring 401. The inner circumference of freewheel sprocket 405 is provided with recesses 403a, which accommodate pawls 403. Pawls 403 are held in place in the recesses 403a by pawl springs 404a and 404b. Pawls 403 are biased by pawl spring 404a and 404b against ratchet surface 406. Sealing ring 407 threads into freewheel 405 and retains the ball bearing set 402b. Pawl spring 404b is provided with a radially-extending extension ending in knob 408. In operation, motive force applied to freewheel sprocket 405 causes pawls 403 to engage the steep-sided faces of ratchet 406, transferring motive force to drive ring 401. Drive ring 401 is rigidly engaged with the hub of the wheel (not shown), and the motive force is thus transferred to the wheel. When the rider stops pedaling, freewheel sprocket 405 stops rotating, and as the drive ring 401 continues to rotate, pawls 403 slide over the shallow faces of ratchet 406. This is ordinary freewheeling operation.

FIG. 5 is a perspective view of the assembled device. The view in FIG. 5 is from the opposite side of that in FIG. 4, so that clockwise motions in FIG. 4 are counterclockwise in FIG. 5. Like elements from FIG. 4 are given like numbers. The extended end of pawl spring 404b traverses slot 409 which is cut into the body of freewheel sprocket 405, and knob 408 rests outside the body of sprocket 405. Slot 409 has concave detents at either end, into which knob 408 drops and is retained by the biasing force of pawl spring 404b. When the user of the device moves knob 408 into the position shown, pawl spring 404b is constricted into a smaller diameter. This locks pawls 403 against ratchet 406, preventing them from riding up and over ratchet 406 and thereby preventing freewheeling. In this mode the device operates as a fixed gear system. Movement of knob 408 to the other detent frees the pawls 403 and restores freewheeling operation.

Figure 7:
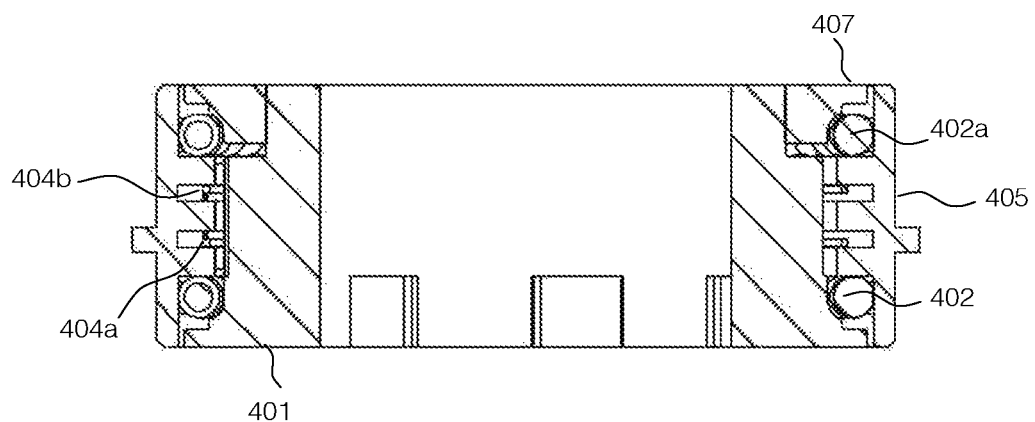
FIG. 7 is a cross-sectional view taken along line B-B of FIG. 6.

FIG. 6 presents a plane view of the assembled device, and FIG. 7 presents a cross section along plane B-B. Like elements from FIG. 4 are given like numbers. As can be seen in FIG. 7, pawl springs 404a and 404b occupy slots cut into the inner circumference of freewheel sprocket 405. Ball bearing sets 402a and 402b ride on races cut into drive ring 401 and sealing ring 407, respectively.

Figure 8:
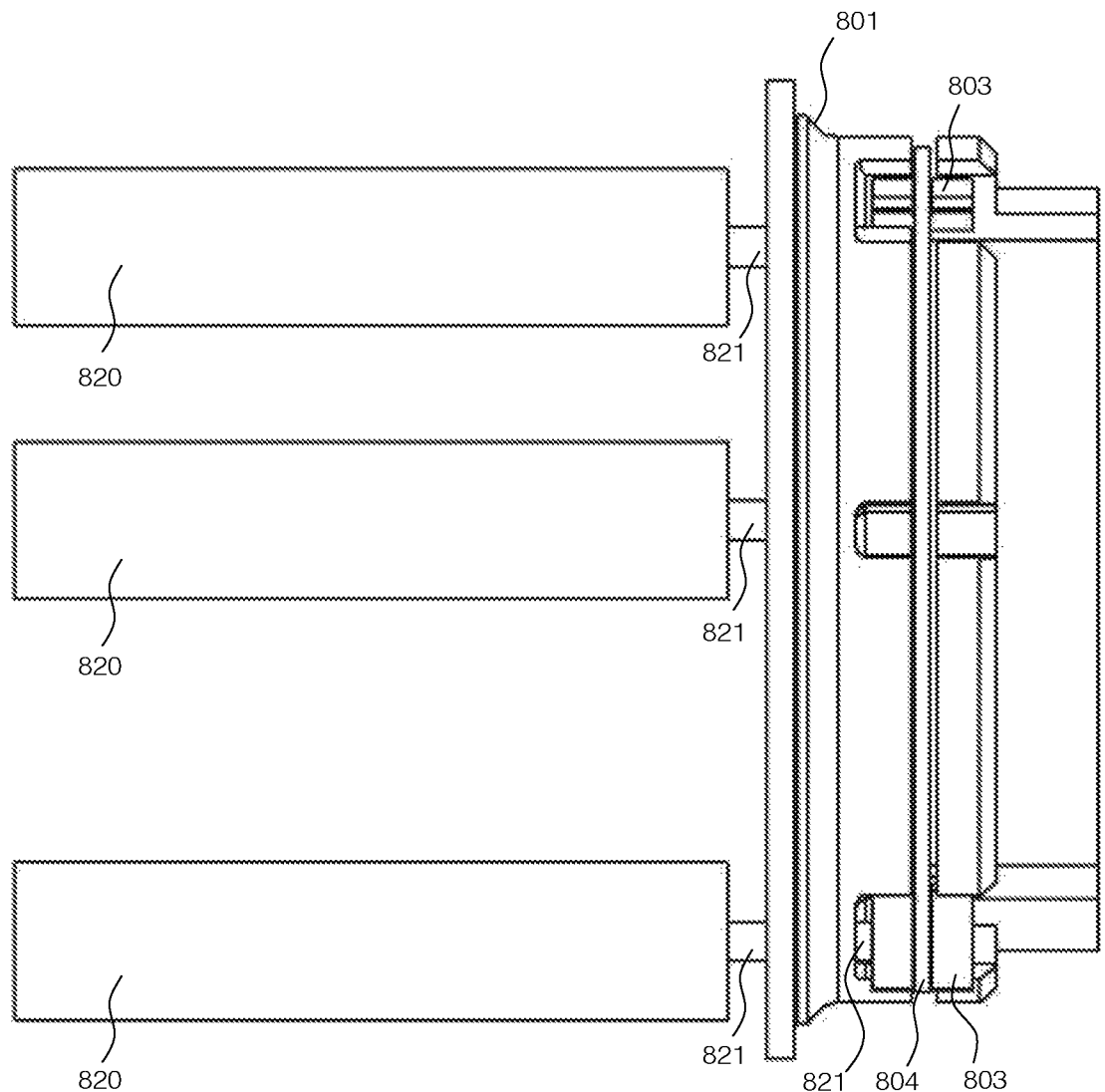
FIG. 8 is a side view of an embodiment employing solenoids and pawl pins.

FIG. 8 shows a plane view of the internal components of an embodiment in which three permanent magnet solenoid cores 820 are configured to move three pawl locking pins 821 into (or out of) drive ring 801 when the solenoids are energized. Movement into the drive ring places the pawl locking pins in positions that interfere with the movement of pawls 803, while movement of the pawl locking pins out of the drive ring frees the pawls, resulting in operation identical to that of the embodiment shown in FIGS. 1-3. The pawls are held in place and biased outwardly by pawl spring 804.

Figure 9:
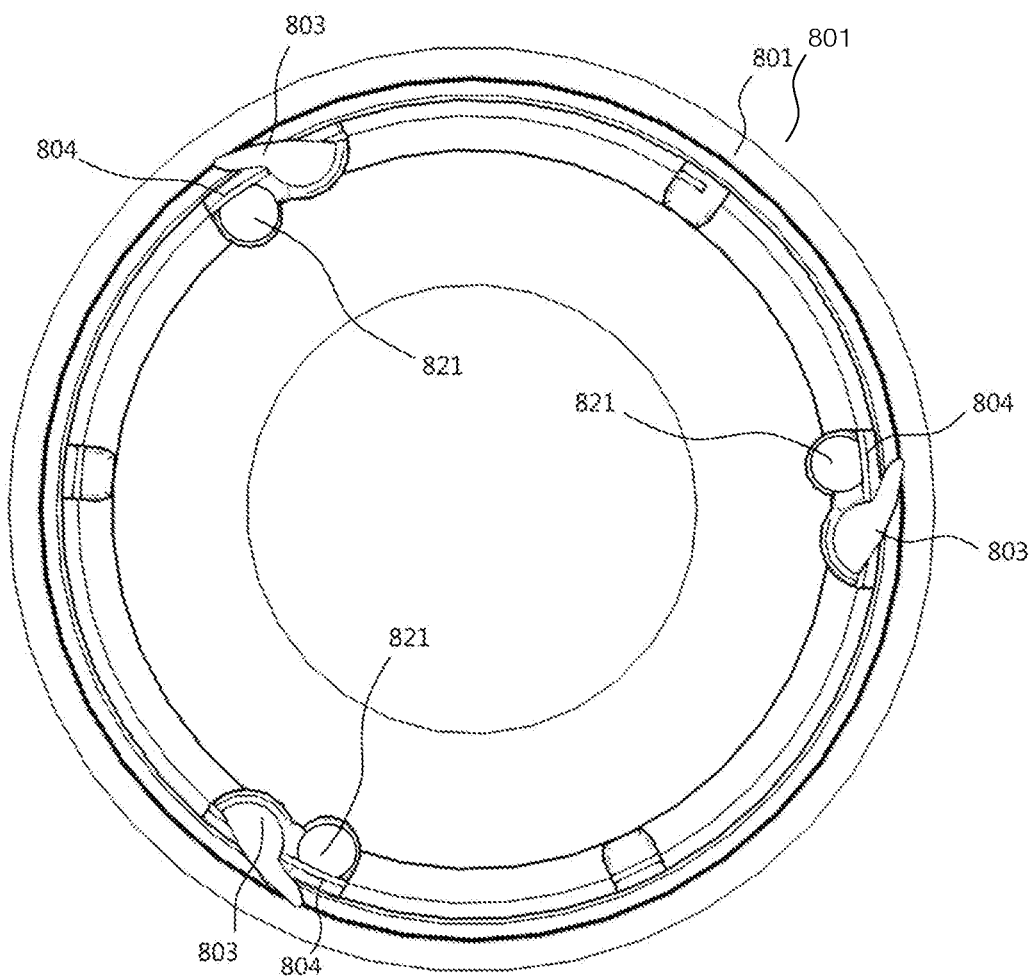
FIG. 9 is a cutaway end-on view of the embodiment of FIG. 8.

FIG. 9 is an end-on plane view of the components of FIG. 8. Like elements from FIG. 8 are given like numbers. The ends of pawl locking pins 821 are shown just behind pawl spring 804. When extended into the drive ring, as shown in the drawings, the pawl locking pins 821 prevent the displacement of pawls 803 into their recesses in drive ring 801. With pawls 803 locked into their extended positions by pawl locking pins 821, freewheeling of the ratchet (not shown) is prevented, and the full assembly, in combination with a freewheel hub, will function as a fixed gear hub.

Figure 10:
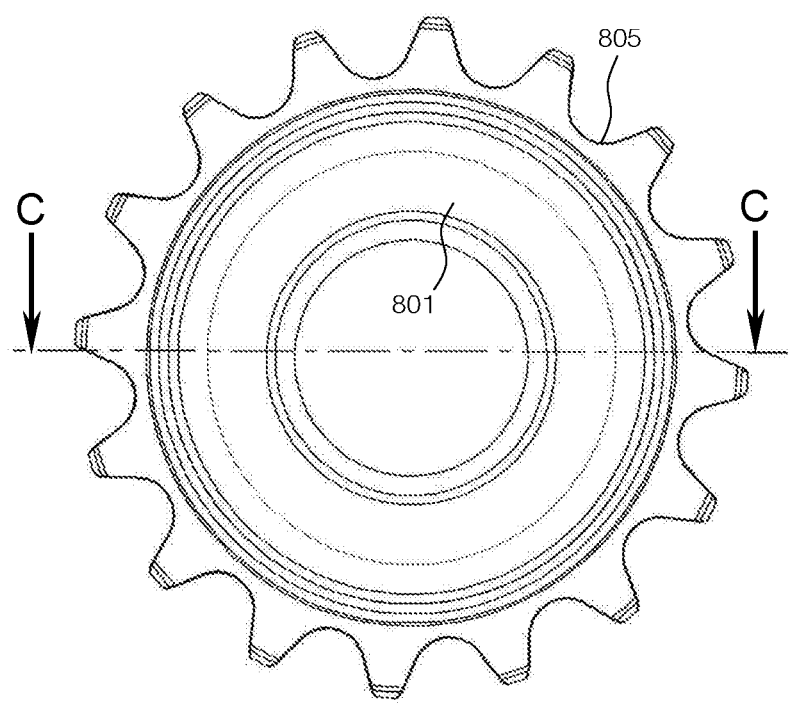
FIG. 10 is an end-on view of the embodiment of FIG. 8.

FIG. 10 is an end-on plane view of the assembled device incorporating the components of FIGS. 8-9, showing the installation of drive ring 801 into a freewheel sprocket 805.

Figure 11:
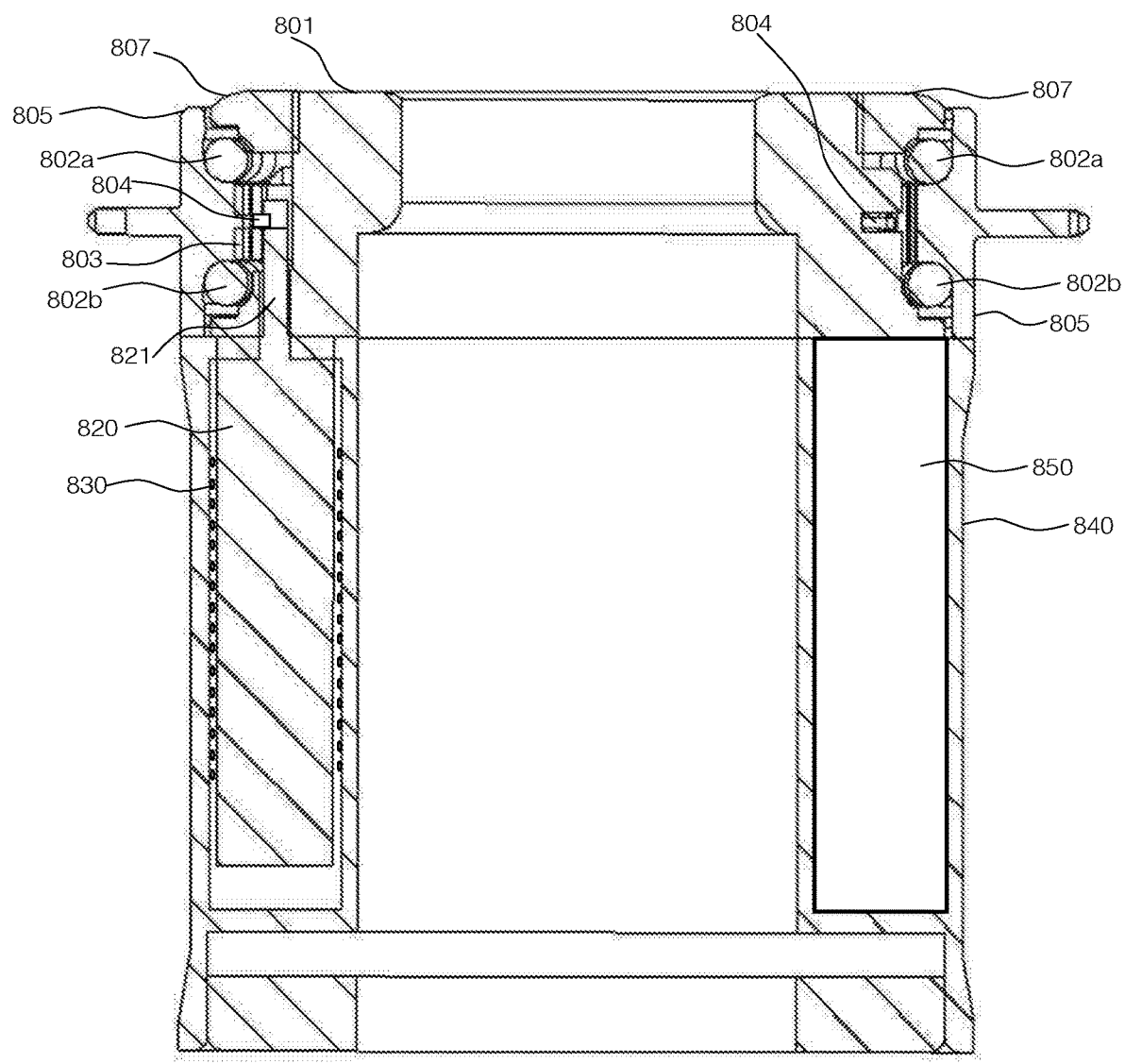
FIG. 11 is a cross-sectional view taken along line C-C of FIG. 10.

FIG. 11 presents a cross section of the assembly of FIG. 10 along plane C-C. Like elements from FIGS. 8-10 are given like numbers. Drive ring 801 rotates within ball bearing sets 802a and 802b. Pawl 803 is held in place by pawl spring 804. Pawl 803 is biased by pawl spring 804 against a ratchet surface (not shown) on the inner circumference of freewheel sprocket 805. Sealing ring 807 threads into drive ring 801 and retains the ball bearing set 802a. Solenoid core 820 is shown in the locked position, with pawl locking pin 821 inserted into drive ring 801. In this embodiment, pawl locking pin 821 travels as far as pawl spring 804. In other embodiments, e.g. where each pawl has its own independent spring, the pawl locking pins may traverse the full width of the pawls. By physically preventing pawl 803 from retreating into its recess, pawl locking pin 821 locks pawl 803 into its radially extended position.

The solenoid core moves in response to the energizing of solenoid coil 830, which is affixed to the interior surface of a cavity 850 in hub body 840. In the embodiment shown, there are six radially distributed cavities 850, three of which are occupied by solenoid coils and cores. In an alternative embodiment, there are six pawls and six solenoids. In yet other embodiments, there may be pawls without corresponding solenoids. The number of pawls, cavities and solenoids may be varied as desired by the practitioner, consistent with maintaining a symmetrical distribution of mass around the axis of the hub. Greater mechanical strength may obtained with more pawls and more solenoids, but with a trade-off in the mass of the device. Preferred embodiments employ two or three pawls, and two or three solenoids. The solenoid coils 830 may be powered by one or more batteries (not shown), which may be installed within the hub (e.g. in cavities 850) or externally, and/or by an external power source such as a wheel-driven magneto. External power may be delivered to the coils 830 by a brush and ring, with the circuit being closed via the axle and frame of the bicycle. Alternatively, a magneto may be incorporated into the hub, as is known in the art; see e.g. U.S. Pat. No. 9,093,887 and references cited therein. As an alternative to, or supplement for, batteries, capacitors may be incorporated into the circuitry for storage and delivery of brief pulses of electrical current to the solenoids.

Figure 12:
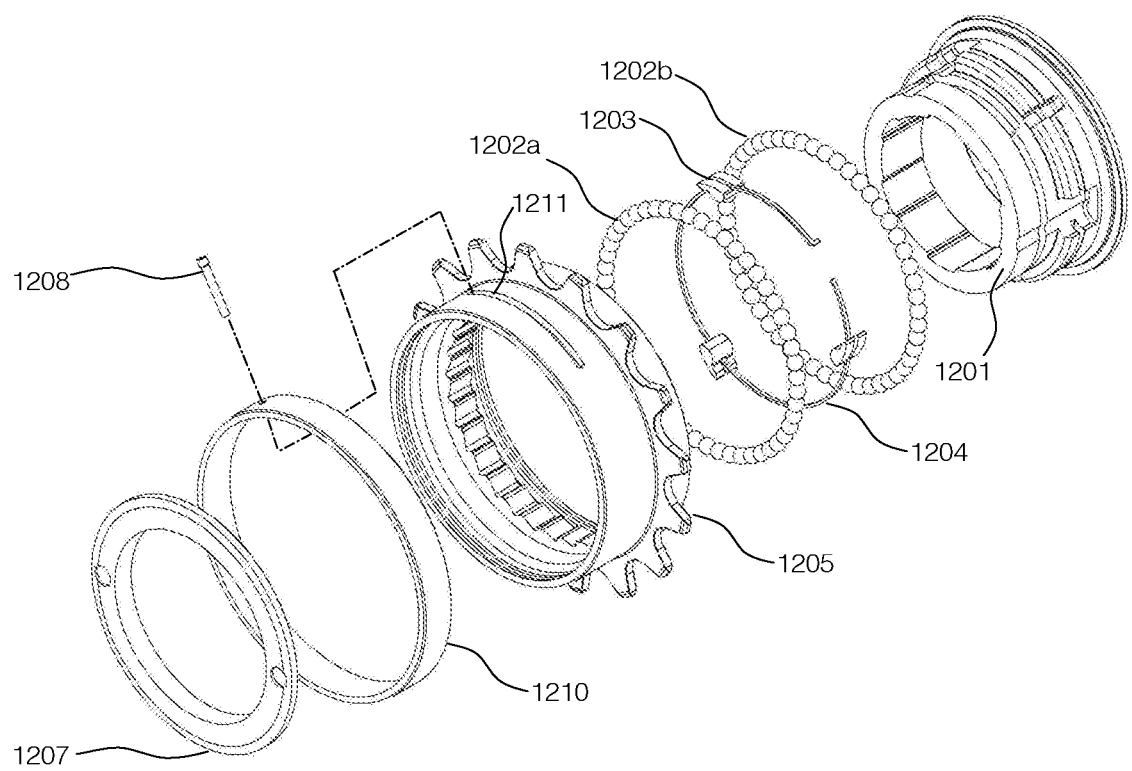
FIG. 12 is an exploded view of an embodiment employing a locking pin.

Referring to FIGS. 12-15, yet another embodiment of the invention is shown. FIG. 12 is an exploded view of the components. Drive ring 1201 rotates within ball bearing sets 1202a and 1202b, and is provided with recesses 1203a which accommodate pawls 1203. Pawls 1203 are held in place in the recesses 1203a by pawl spring 1204. Pawls 1203 are also biased by pawl spring 1204 against ratchet 1206, which is formed on the inner surface of freewheel sprocket 1205. Pawls 1203 engage the steep faces of ratchet surface 1206, and provide positive engagement between freewheel 1205 and the drive ring 1201, when the sprocket is driven in the forward direction (FIG. 1 is a view from the outer side of the sprocket, from which perspective forward is clockwise.) When the sprocket is not being driven (when the rider stops pedaling), freewheel 1205 stops rotating while the drive ring 1201 (and the hub and wheel) continue to rotate clockwise. In this freewheeling mode, pawls 1203 slide up and over the shallow sides of ratchet surface 1206. Sealing ring 1207 threads into freewheel 1205 and retains the ball bearing set 1202a. Pin 1208 is fixed to mode selection ring 1210 and extends through slot 1211 in freewheel sprocket 1205. Slot 1211 defines a spiral path along the axis of the device, so that when mode selection ring 1210 is rotated, and pin 1208 is impelled along this spiral path, mode selection ring 1210 and pin 1208 undergo an axial translation. In the interest of clarity, only a single pin is illustrated, but in preferred embodiments, there are two to four symmetrically disposed pins and two to four corresponding slots.

Figure 13A:
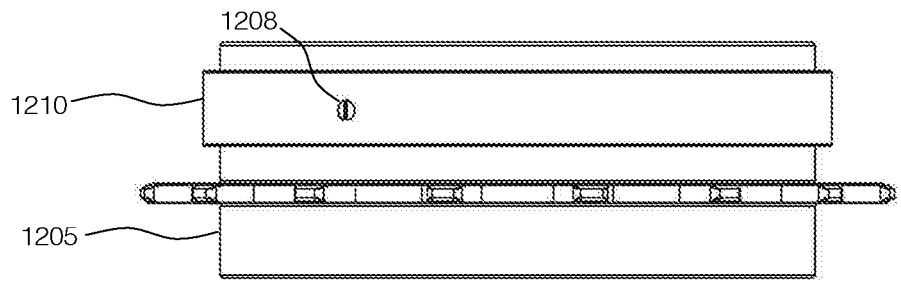
FIG. 13A-13B are external views of the embodiment of FIG. 12.
Figure 13B:
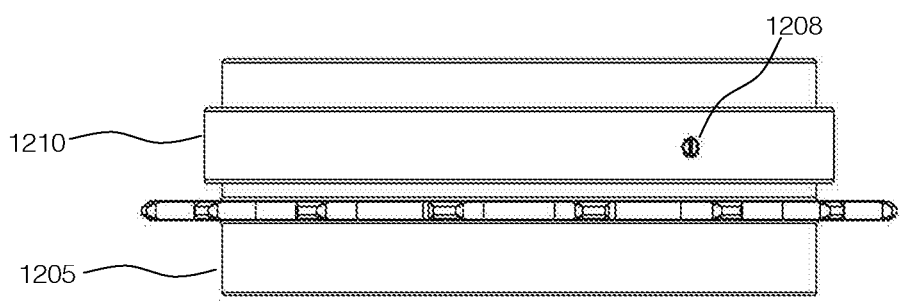

FIGS. 13A and 13B are side views of the assembled device, with the mode selection ring illustrated, showing the mode selection ring 1210 in its fully clockwise (FIG. 13A) and fully counterclockwise (FIG. 13B) positions. The change in the axial position of the mode selection ring is evident.

Figure 14A:
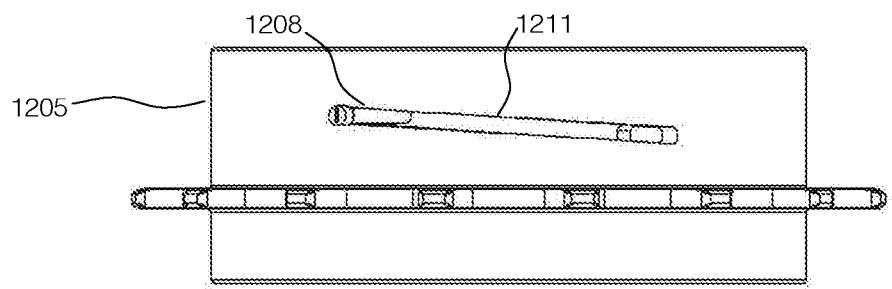
FIGS. 14A-14B are internal views of the embodiment of FIG. 12.
Figure 14B:
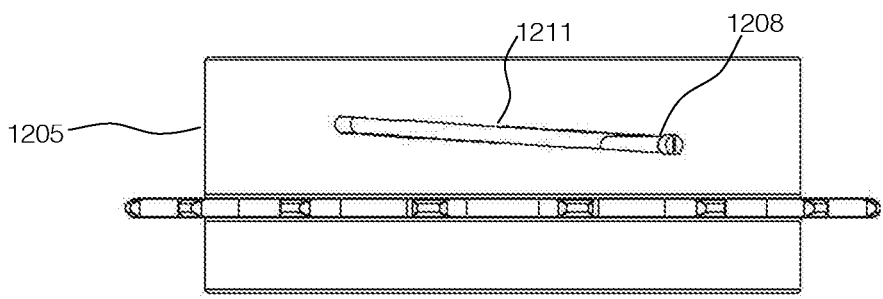
Figure 15A:
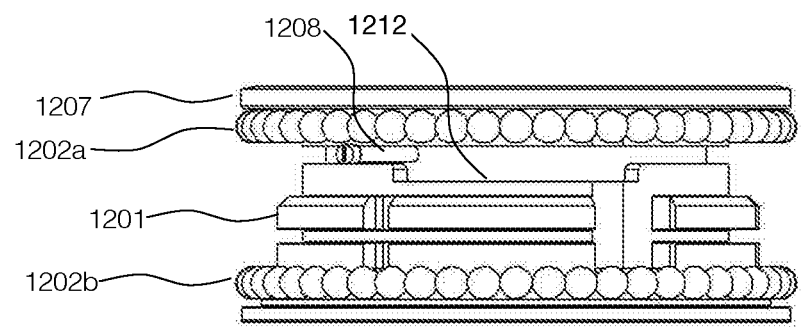
FIGS. 15A-15B are cutaway views of the embodiment of FIG. 12.
Figure 15B:
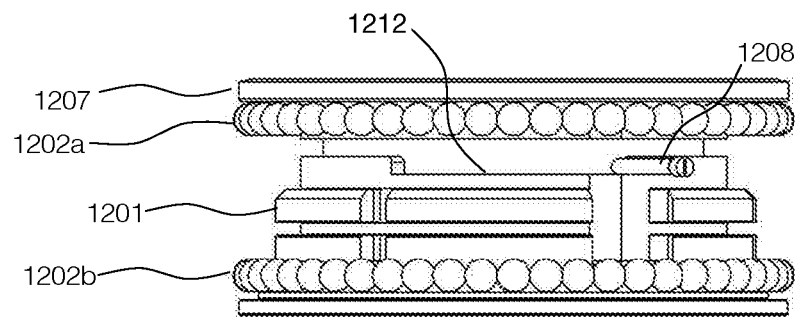

FIGS. 14A and 14B are side views of the assembled device, with the mode selection ring 1210 omitted, showing pin 1208 in fully clockwise (FIG. 14A) and counterclockwise (FIG. 14B) positions. When the mode selection ring 1210 is rotated counterclockwise until pin 1208 reaches the end of slot 1211, as shown in FIG. 14B, pin 1208 engages with drive ring 1201, as shown in FIGS. 15A and 15B, thereby locking drive ring 1201 to freewheel 1205. In this locked mode, freewheeling is prevented, and the entire assembly acts as a fixed-gear hub.

FIGS. 15A and 15B are side views of the interior of the device, corresponding to FIGS. 14A and 14B with the freewheel sprocket, pawls, and pawl spring omitted for clarity. When retracted, as in FIG. 15A, the pin 1208 encounters no obstacles as the freewheel sprocket (not shown) rotates relative to drive ring 1201, and the device operates as a normal freewheel assembly. The spiral path of the pin 1208, as mode selection ring 1210 (not shown) is rotated counter-clockwise, brings it into the confines of a recessed pin receiving cavity, in the form of a notch 1212 cut into drive ring 1201, as illustrated in FIG. 15B. When pin 1208 is confined to the notch 1212, as the freewheel rotates the pin 1208 cannot proceed beyond the end of the notch 1212. A mechanical connection between the freewheel and the drive ring is thereby established, and the freewheel sprocket and drive ring 1201 are rotationally locked, i.e., forced to rotate together. In this configuration the device enables a freewheel hub to operate as a fixed-gear hub.

Figure 16:
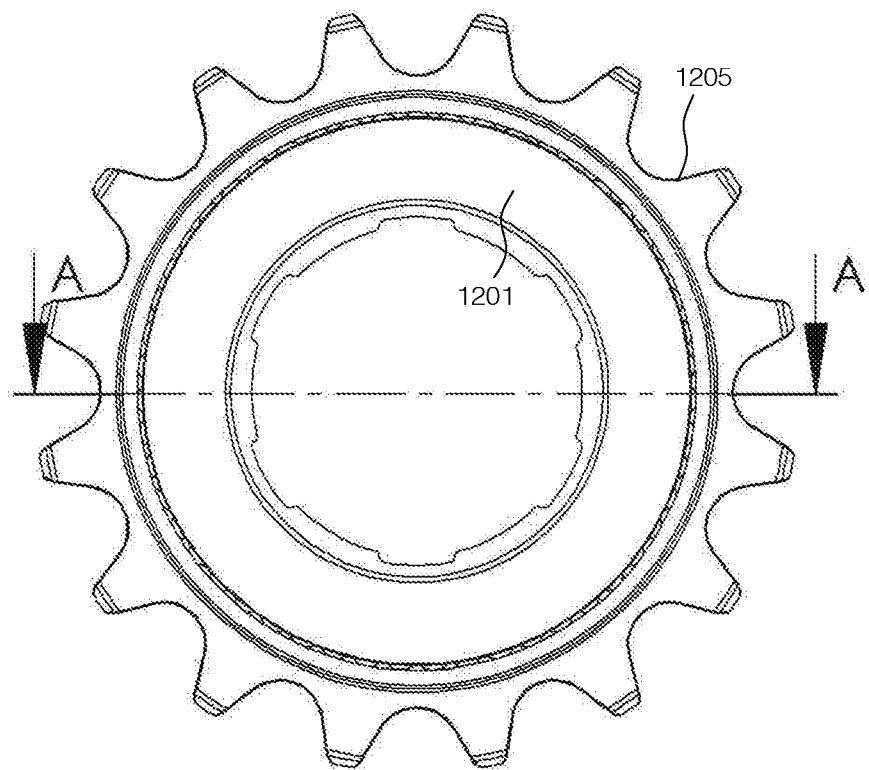
FIG. 16 is an end-on plane view of the embodiment of FIG. 12.

FIG. 16 is an end-on plane view of the assembled device incorporating the components of FIGS. 12-15, showing the installation of drive ring 1201 into a freewheel sprocket 1205.

Figure 17:
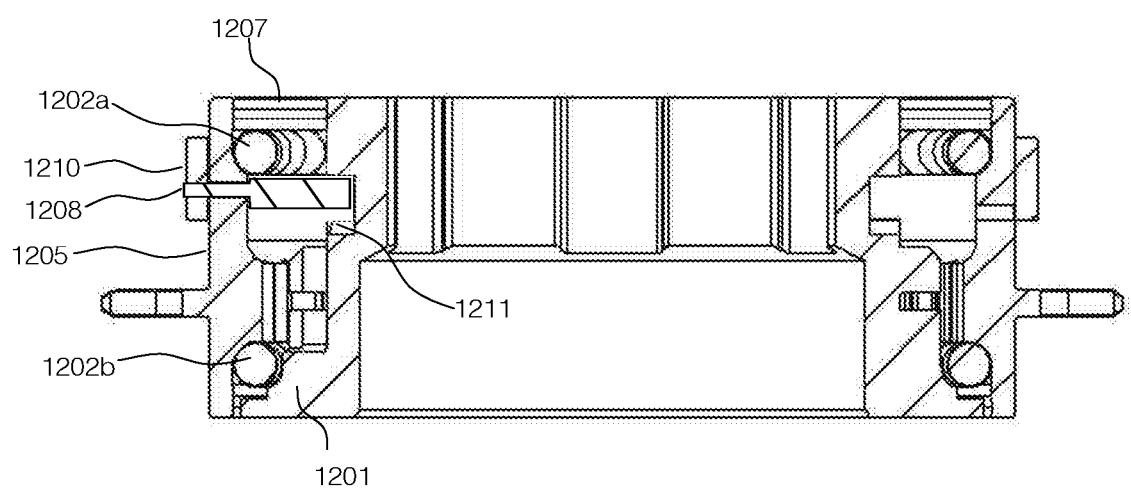
FIG. 17 is a cross-sectional view taken along line A-A of FIG. 16.

FIG. 17 presents a cross section of the assembly of FIG. 16 along plane A-A. Like elements from FIGS. 12-15 are given like numbers. Drive ring 1201 rotates within ball bearing sets 1202a and 1202b. Sealing ring 1207 threads into freewheel 1205 and retains the ball bearing set 1202a. Pin 1208 is shown fixed to mode selection ring 1210, and is shown in the retracted position, where it clears notch 1211 and permits freewheeling between the drive ring 1210 and the freewheel sprocket 1205. The pawls, pawl spring, and ratchet operate as shown in FIGS. 1-3 and are not detailed here.

The above descriptions and the referenced drawings are presented for illustrative purposes, and are not meant to be limiting. Modifications and alterations of these exemplary non-frictional positive locking mechanisms will be apparent to those of skill in the art, and are contemplated to be within the scope and spirit of the invention.

I claim:

1. A freewheel assembly for a bicycle, comprising:
   (a) a sprocket; and
   (b) a drive ring that is mountable on a freewheel hub;
   wherein the sprocket and drive ring are in a freewheeling relationship, where the sprocket freely rotates counter-clockwise relative to the drive ring, but is rotationally locked to the drive ring when rotating clockwise, and
   a reversible non-frictional positive locking mechanism, which, when engaged, rotationally locks the sprocket to the drive ring so as to prevent freewheeling, thereby converting the assembly to fixed-gear operation.

2. The freewheel assembly of claim 1, wherein the non-frictional positive locking mechanism comprises a pin or set screw movably affixed to the sprocket, said pin or set screw being movable into engagement with a cavity in the drive ring, so as to rotationally lock the drive ring to the sprocket.

3. A hub for a bicycle wheel, comprising a freewheel hub and the freewheel assembly according to claim 2.

4. A bicycle wheel, comprising the hub according to claim 3.

5. The freewheel assembly of claim 1, wherein the non-frictional positive locking mechanism comprises one or more pins affixed to a rotating ring and set into spiral tracks in the sprocket, configured so that rotation of the ring moves the pins through the tracks and the spiral tracks imparts an axial movement to the pins, and wherein the axial movement brings the pins into recessed pin receiving cavities in the drive ring, resulting in a mechanical connection between the sprocket and the drive ring.

6. A hub for a bicycle wheel, comprising a freewheel hub and the freewheel assembly according to claim 5.

7. A bicycle wheel, comprising the hub according to claim 6.

8. A hub for a bicycle wheel, comprising a freewheel hub and the freewheel assembly according to claim 1.

9. A bicycle wheel, comprising the hub according to claim 8.

* * * * *